(12) United States Patent
Stewart et al.

(10) Patent No.: US 7,805,578 B2
(45) Date of Patent: Sep. 28, 2010

(54) DATA PROCESSOR APPARATUS AND MEMORY INTERFACE

(75) Inventors: Malcolm Stewart, Ottawa (CA); Denny Wong, Ottawa (CA)

(73) Assignee: Mtekvision Co., Ltd., Seoul (KR)

( * ) Notice: Subject to any disclaimer, the term of this patent is extended or adjusted under 35 U.S.C. 154(b) by 955 days.

(21) Appl. No.: 11/380,978

(22) Filed: May 1, 2006

(65) Prior Publication Data
US 2007/0011412 A1    Jan. 11, 2007

Related U.S. Application Data

(60) Provisional application No. 60/675,898, filed on Apr. 29, 2005.

(51) Int. Cl.
*G06F 12/00* (2006.01)

(52) U.S. Cl. ............... 711/152; 710/305; 710/107

(58) Field of Classification Search ............... 711/170, 711/112, 114, 162, 165, 154, 152; 710/305, 710/107
See application file for complete search history.

(56) References Cited

U.S. PATENT DOCUMENTS

| | | | | |
|---|---|---|---|---|
| 5,720,027 A | * | 2/1998 | Sarkozy et al. | 714/6 |
| 6,959,351 B2 | * | 10/2005 | Gwilt et al. | 710/110 |
| 2001/0039607 A1 | * | 11/2001 | Goldstein et al. | 711/170 |
| 2004/0064637 A1 | * | 4/2004 | Fujibayashi et al. | 711/113 |

* cited by examiner

*Primary Examiner*—Pierre-Michel Bataille
(74) *Attorney, Agent, or Firm*—Birch Stewart Kolasch & Birch, LLP

(57) ABSTRACT

A data processor apparatus and memory interface comprises a memory, a plurality of memories, an interface for controlling access to the memories by a device, and an identifier identifying at least a memory location in one memory and a memory location in another memory. The interface is responsive to the identifier to condition the memory locations for receiving data and/or for transferring data therefrom. This arrangement eliminates the need for a dedicated broadcast bus from the array controller to each processor unit (PU), which thereby enables the area/space required to accommodate the data processor to be significantly reduced.

31 Claims, 3 Drawing Sheets

DATA PROCESSOR APPARATUS AND MEMORY INTERFACE

CROSS REFERENCE TO RELATED APPLICATION

This application claims the benefit of U.S. provisional application Ser. No. 60/675,898, filed Apr. 29, 2005 the disclosure of which is incorporated herein by reference.

BACKGROUND OF THE INVENTION

The present invention relates to data processors and in particular to processors having a plurality of processor units capable of operating in parallel.

A bus refers to a collection of wires through which data is transmitted from one part of a computer to another. There is a bus that connects all the internal computer components to the CPU and main memory. There's also an expansion bus that enables expansion boards to access the CPU and memory. The size of a bus, known as its width, is important because it determines how much data can be transmitted at one time. For example, a 16-bit bus can transmit 16 bits of data, whereas a 32-bit bus can transmit 32 bits of data. A point-to-point bus directly connects the two components communicating going from a specific source to a specific destination e.g. a computer and printer connected by a ribbon cable. A broadcast bus is used to communicate with several devices, where all the devices connected to the bus receive all the signals broadcast so an address of the device to receive the signal must be broadcast as well. Generally, a data bus is used for transferring data; an address bus is used for identifying where the data is going to; and a control bus is used for controlling signals such as read or write.

A general goal for computers is faster and faster operation. One solution has been to develop individual processor units with higher operating speeds. Other solutions have been to develop computers with multiple processor units operating in parallel. Compared to a computer with a single processor, parallel computers have not had the desired increase in operating speeds as might be expected. As the number of parallel processor units have increased, the interplay between the parallel processors has become much more complex and the marginal increase in operating speeds has fallen.

SIMD (Single Instruction, Multiple Data), which represents one of styles of parallel processing, is a set of operations for efficiently handling large quantities of data in parallel, as in a vector processor or array processor. The most important architectural aspect of SIMD is the organization of the processor array. One such architecture is the processing element to processing element organization. In this configuration, N processing elements are connected via an interconnection network. Each processing element (PE) is a processor with local memory. The PEs execute the instructions that are distributed to the PEs by an array control unit (ACU) via a broadcast bus. A second SIMD architecture is the processor to memory organization. In this configuration, a bidirectional interconnection network connects the N processors and M memory modules. The processors are controlled by the ACU via the broadcast bus. Data is exchanged between processors via the interconnection network and the memory modules. Again, data transfers between the memories and the I/O interface are handled via the I/O bus, and a result bus is used.

One of the impediments to high speed parallel processing has been long routing time. Typically a broadcast bus is just included to all of the processing units. In conventional data processors which have 8-bit computational units, we simplified things by running a single bit broadcast and loading 8-bits in one at a time (a serial transfer of bits). Another way to get around a broadcast bus is to keep all of the constants in the computational units own memory space. The problem with this system is that if you have a lot of constants, then a great deal of memory space is "wasted" saving the constant values when it could be used for something else. The disadvantage of the prior art is that more routing lines (wires) are required to get the broadcast bits to the computational units. The performance using this method of broadcast bus will make the memory bus marginally more busy. Secondly, if the constants are all just saved in each CU's memory space than a great deal of memory space will need to be reserved for constant operations and will be unavailable for processing. Finally, performance will not be as good as having the full constant word broadcast to each computational units; however, compared to a bitwise constant broadcast we will still see a significant improvement in performance.

The present invention offers implementation described was created in order to reduce the routing congestion in the design and at the same time increase performance. By reusing the memory buses, the need for a dedicated broadcast bus connected to the computational units is eliminated.

SUMMARY OF THE INVENTION

According to one aspect of the present invention, there is provided a data processor apparatus comprising a memory, a plurality of processor units couplable to receive data from the memory, and control means for controlling transmission of data from the control means to each processor unit, wherein the control means is adapted for transmitting a predetermined data unit for each processor unit to the memory and for controlling each processor unit to receive the predetermined data unit from the memory. The memory also can be a random access memory, such as DRAM.

In this arrangement, data intended for each processor unit, e.g. broadcast data, is transmitted from the controller to the memory and then transferred from the memory into each processor unit. Advantageously, this eliminates the need for a dedicated broadcast bus between the controller and each processor unit, thereby saving a significant amount of chip real estate or area. Also, this makes the system operate faster compared to bitwise broadcast.

In some embodiments, the control means is adapted to generate the predetermined data unit, e.g. broadcast data, or the data may originate from elsewhere.

In some embodiments, the data processor apparatus further comprises data bus means couplable to the memory for transmitting data thereto, including data from the controller. In this embodiment, the controller can transmit broadcast data intended for each processor unit to the memory using an existing data bus coupled to the memory. In some embodiments, the controller is arranged to control operations of each processor unit, and may for example comprise an array controller of a SIMD (single instruction multiple data) processor, or other processor.

In some embodiments, the data processor apparatus comprises a control bus for transmitting commands/instructions for controlling operations of each processor unit from the controller to each processor unit. This arrangement may be used to implement SIMD functionality. In some embodiments, the controller is adapted to transmit the same instruction to each processor unit substantially simultaneously.

In some embodiments, the controller is adapted to transmit data intended for each processor unit to a plurality of different parts of the memory such that a plurality of copies of the predetermined data unit are stored in different parts of the memory. Different processor units may be couplable to respective different parts of the memory and the controller may be adapted to control different processor units to receive a copy of the predetermined data from respective different parts of the memory.

The controller may be adapted to control the memory such that the copies of the predetermined data stored in the memory are downloaded into a plurality of processor units substantially simultaneously.

In some embodiments, the plurality of processor units comprises first and second processor units, the first processor unit being capable of receiving data from a first part of the memory and the second data processor unit being capable of receiving data from a second part of the memory, and wherein the control means is adapted to transmit a predetermined data unit to the memory such that the predetermined data unit is stored in the first part of the memory and the predetermined data unit is stored in the second part of the memory, and the controller is adapted to control the first processor unit to receive the predetermined data unit stored in the first part of the memory and to control the second processor unit to receive the predetermined data stored in the second part of the memory.

In some embodiments, the data processor apparatus may further comprise a memory interface coupled to the memory and having at least one of a data input for receiving data from an external source for the data processor apparatus and a data output for outputting data externally from the data processor apparatus, and a data input coupled to the controller, for example for receiving data for transmission to the memory and/or the processor units.

In some embodiments, the memory interface further comprises control means for controlling and arbitrating access to the memory by the controller and by an external source/device. The memory interface may be adapted to control read and/or write operations of the memory. For example, the memory interface may be adapted to control at least one of read access and write access of external means to the memory. Alternatively, or in addition, the memory interface may be adapted to control at least one of read access and write access of the control means to the memory. For example, the memory interface may be adapted to transmit any one or more of memory enable signals, write enable signals, read enable signals and byte write enable signals to the memory.

In some embodiments, the data processor apparatus comprises a data bus between the memory interface and the memory for transmitting data thereon, and a data bus (e.g. broadcast bus) between the control means and the memory interface for transmitting data for each processor unit (and/or the memory) from the control means to the memory interface.

In some embodiments, the data bus has a plurality of groups of data lines, each group comprising at least one one bit data line, and means for generating a plurality of copies of the same predetermined data unit, wherein the control means or interface is adapted to transmit a copy of the predetermined data unit on each group of data lines.

In some embodiments, a first group of data lines is connected to a first part of the memory and a second group of data lines is connected to a second part of the memory.

In some embodiments, the controller or interface is adapted to transmit the copies of the predetermined data on each group of data lines substantially simultaneously.

In some embodiments, the memory and data processor units are integrated on the same monolithic substrate.

In some embodiments, the memory comprises a plurality of memory blocks and a plurality of processor units may be couplable to each memory block.

Each processor unit may comprise a plurality of one bit processor elements. Each processor unit may be capable of processing a multiple bit word, and each one bit processor element of each processor unit may be capable of processing one bit of the multiple bit word.

According to another aspect of the present invention, there is provided a data processor apparatus comprising a memory, a plurality of data receiving units for receiving data from said memory, and control means for controlling said data receiving units, and a data bus coupled between said control means and said memory for carrying data from said control means to said memory without passing through said data receiving units.

According to another aspect of the present invention, there is provided a data processor apparatus comprising a memory, a plurality of data receiving units for receiving data from the memory, and control means for controlling transmission of data from said control means to each data receiving unit, wherein said control means is adapted for transmitting a predetermined data unit for each data receiving unit to said memory and for controlling at least one of the memory to transfer the data from the memory to one or more data receiving unit(s), and one or more data receiving unit(s) to receive data from the memory.

According to another aspect of the present invention, there is provided a data processor apparatus comprising a memory, a plurality of data receiving units for receiving data from the memory, a data bus couplable to the memory for transferring data to the memory and control means for controlling operations of said data receiving units and arranged for outputting data intended for one or more of said receiving units onto said data bus.

According to another aspect of the present invention, there is provided a data processor apparatus comprising a memory, a plurality of data receiving units couplable to receive data from said memory, control means for controlling transmission of data from said control means to each data receiving unit and a control bus connected from said control means to each data receiving unit for controlling operations of said data receiving units, and wherein said control means is adapted to transmit both information data and control data to the data receiving units on said control bus.

According to another aspect of the present invention, there is provided a method of transferring data from an array controller to a plurality of data receiving units controlled by said array controller in a data processor apparatus comprising a memory and a plurality of data receiving units couplable to said memory, the method comprising transmitting said data from said controller to one or more of said data receiving units using structure other than a broadcast data bus between the array controller and the data receiving units.

According to another aspect of the present invention, there is provided a data processor apparatus comprising a memory and a plurality of data receiving units couplable to receive data from said memory, and control means for controlling transmission of broadcast data controlled by said control means to one or more data receiving unit(s) and wherein said control means is adapted to cause said broadcast data to be transmitted to one or more data receiving unit(s) via structure other than a dedicated broadcast data bus connected between said controller and each data receiving unit.

According to another aspect of the present invention, there is provided a memory interface for controlling access to a memory comprising a data input for receiving data for said memory and a data output for transferring data to said memory, and data transfer means configured to transfer a predetermined data unit received at the data input to a plurality of different memory locations in said memory so that a copy of said predetermined data unit is stored in each of said different memory locations.

According to another aspect of the present invention, there is provided a method of transferring data to a memory of a data processor, comprising receiving a data unit, conditioning a plurality of memory locations in said memory to receive a copy of said predetermined data unit, and transferring said data unit to said plurality of memory locations.

According to another aspect of the present invention, there is provided an apparatus comprising a plurality of memories and an interface for controlling access to said memories by a device, an identifier identifying at least a memory location in one memory and a memory location in another memory, and said interface is responsive to said identifier to condition said memory locations for receiving data and/or for transferring data therefrom.

According to another aspect of the present invention, there is provided a memory interface for controlling access to a plurality of memories comprising a data input and a plurality of data outputs, and wherein said controller is responsive to a control signal to switch data received at the input onto said plurality of outputs, optionally substantially simultaneously.

According to another aspect of the present invention, there is provided a data structure comprising a set of identifiers, wherein each identifier identifies at least a memory location in a first memory and a memory location in a second memory.

BRIEF DESCRIPTION OF THE DRAWINGS

Examples of embodiments of the present invention, will now be described with reference to the drawings in which.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts.

DETAILED DESCRIPTION

Figure 1:
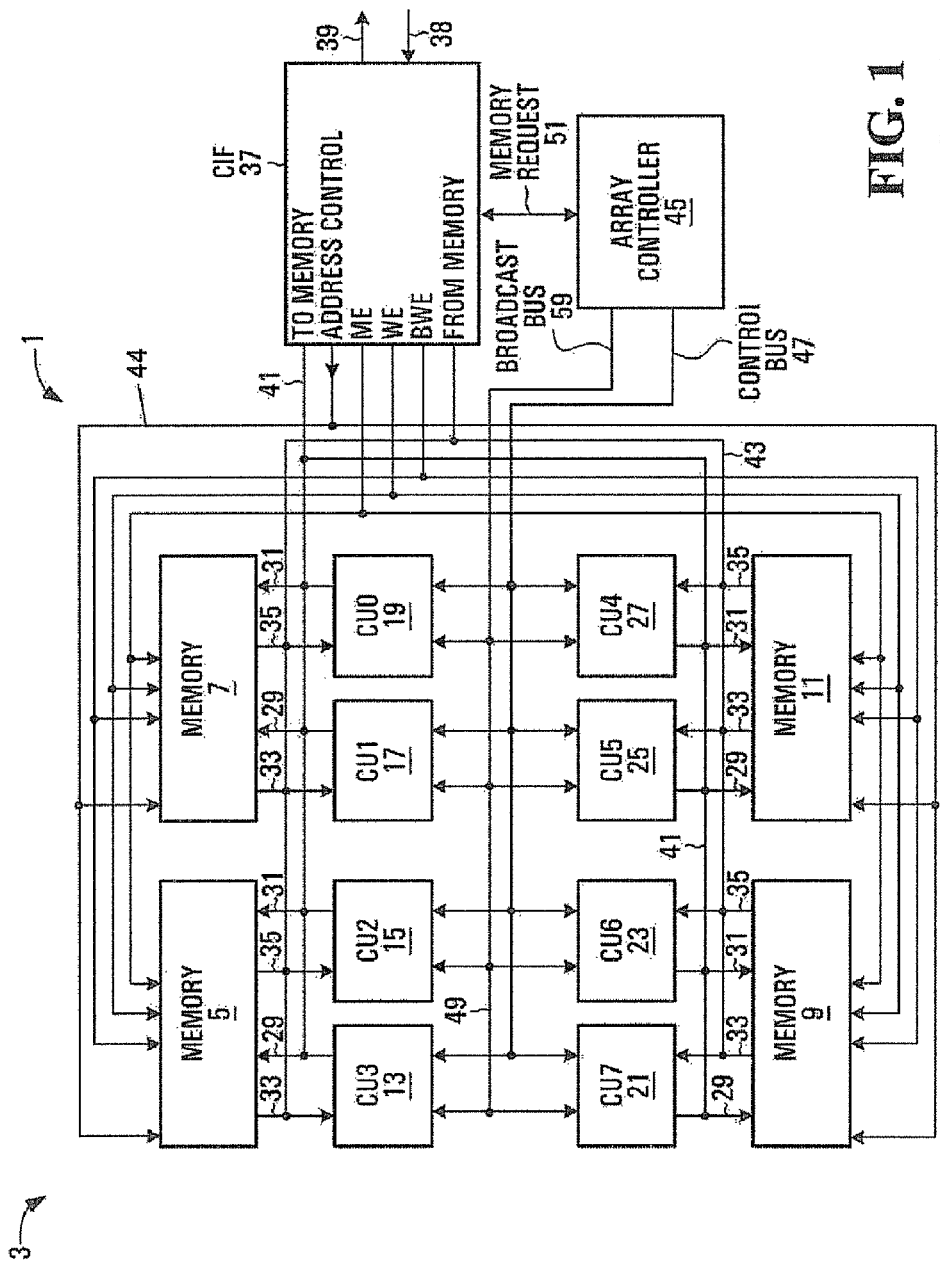
FIG. 1 shows a block diagram of a data processor apparatus.

Referring to FIG. 1, a data processor apparatus 1 comprises a memory 3 and a plurality of processor units (PU) or computational units (CU) 13, 15, 17, 19, 21, 23, 25, 27 coupled to the memory 3. In this example, the memory 3 comprises a plurality of memory segments or memories 5, 7, 9, 11, and two processor units 13, 15, 17, 19, 21, 23, 25, 27 are coupled to each memory segment. In one embodiment, the memories may be 16 bits wide and the processor units may each be 8 bits wide. The upper part of the memory having a width of 8 bits, and I/Os 8-15, is couplable to one of the processor units 13, 17, 21, 25 and the lower part of the memory having a width of 8 bits, and I/Os 0-7, is couplable to the other processor unit 15, 19, 23, 27. Each memory has data inputs 29, 31 for receiving data to be stored in the memory and data outputs 33, 35 for outputting data from the memory. In this example, the upper part of each memory has a data input 29, comprising input ports for bits 8-15, and the lower part has a data input 31 comprising input ports for bits 0-7. Similarly the upper and lower parts of each memory has a data output 33,35, respectively, comprising output ports for bits 8-15 and 0-7, respectively.

The data processor 1 comprises a memory interface block 37 for coupling the memory externally so that the memory can receive data from and output data to the outside world. To this end, the memory interface 37 comprises a data input port 38 for receiving external data and may include an output port 39 for outputting data externally. The memory interface 37 also arbitrates access to the memory by external source(s) and by the processor units. A data bus 41 is connected from the memory interface 37 to each memory input port 29, 31 for transferring data from the memory interface 37 to the memory, and a data bus 43 is connected between the memory interface and the output ports 33, 35 of the memory for carrying data from the memory to the memory interface.

An address bus 44 is connected from the memory interface 37 to each memory segment 5, 7, 9, 11 for carrying memory address control data, e.g. row select signals, to select the memory location (e.g. row) to which data is to be written to or read from. The memory address bus may have any desired width depending on the depth (i.e. number of rows of storage elements in each memory segment and is typically "n", where the number of rows is 2n).

The memory interface block 37 is capable of generating the following signals:

a) ME—memory enable. This signal turns the memory on and off. For example, when ME equals 1, the memory is on, and when ME equals 0, the memory is off. Each memory or memory segment 5, 7, 9, 11 receives its own ME signal.

b) WE—write enable. This signal controls the memory between write mode and read mode. For example, when WE equals 1, the memory is in write mode, and when WE equals 0, the memory is in read mode. Each memory or memory segment 5, 7, 9, 11 receives its own WE signal.

c) BWE—byte write enable. When the memory is in write mode, BWE enables or disables a byte wide subset of the input pins. This allows byte wide conditional writes to memory to be performed. For example, if the memory IO (input/output) width is 16 bits, and the data bus to the memory from the memory interface 37 is 8 bits wide, it is possible to write to the upper 8 bits of the memory by setting (the upper) BWE [1]=1 and (the lower) BWE [0]=0. In this way, although each single bit data line of the data bus is shared between two memory input ports, the byte write enable signal allows one of the two input ports to be selected for writing data into memory.

A means may be provided to enable the processor units to individually control the BWE signals associated with them. For example, the BWE signal from the memory interface 37 may be OR'd with a BWE signal from each processor unit. This ORing can be implemented so that when the array controller makes a memory request to the memory interface, the memory interface 37 outputs BWE [1]=BWE [0]=0, and the processor units can then control their respective BWE inputs.

For write operations from the processor units into their respective memories or memory segments, all ME and WE signals are set to 1, and the processor units control the BWE inputs. For write operations from an external source into memory, the memories can be controlled so that only one of the memories is write enabled (ME=WE=1) and the memory interface 37 may turn on only one of the upper or lower byte write enable signals BWE [1] and BWE [0]. Thus, the interface can select which memory segment or element and the upper or lower part of the selected memory segment to which data is to be written.

The data processor further comprises an array controller 45 for controlling operations of each processor unit and a control bus 47 connected to a control input of each processor unit for sending instructions/commands to each processor unit. The data processor also includes a broadcast bus 59 to enable the array controller 45 to send data intended for all data processor units, i.e. broadcast data, to all of the data processor units. The array controller 45 is capable of generating memory requests 51, and means 51 is provided for transmitting request data from the array controller 45 to the memory interface 37.

Figure 2:
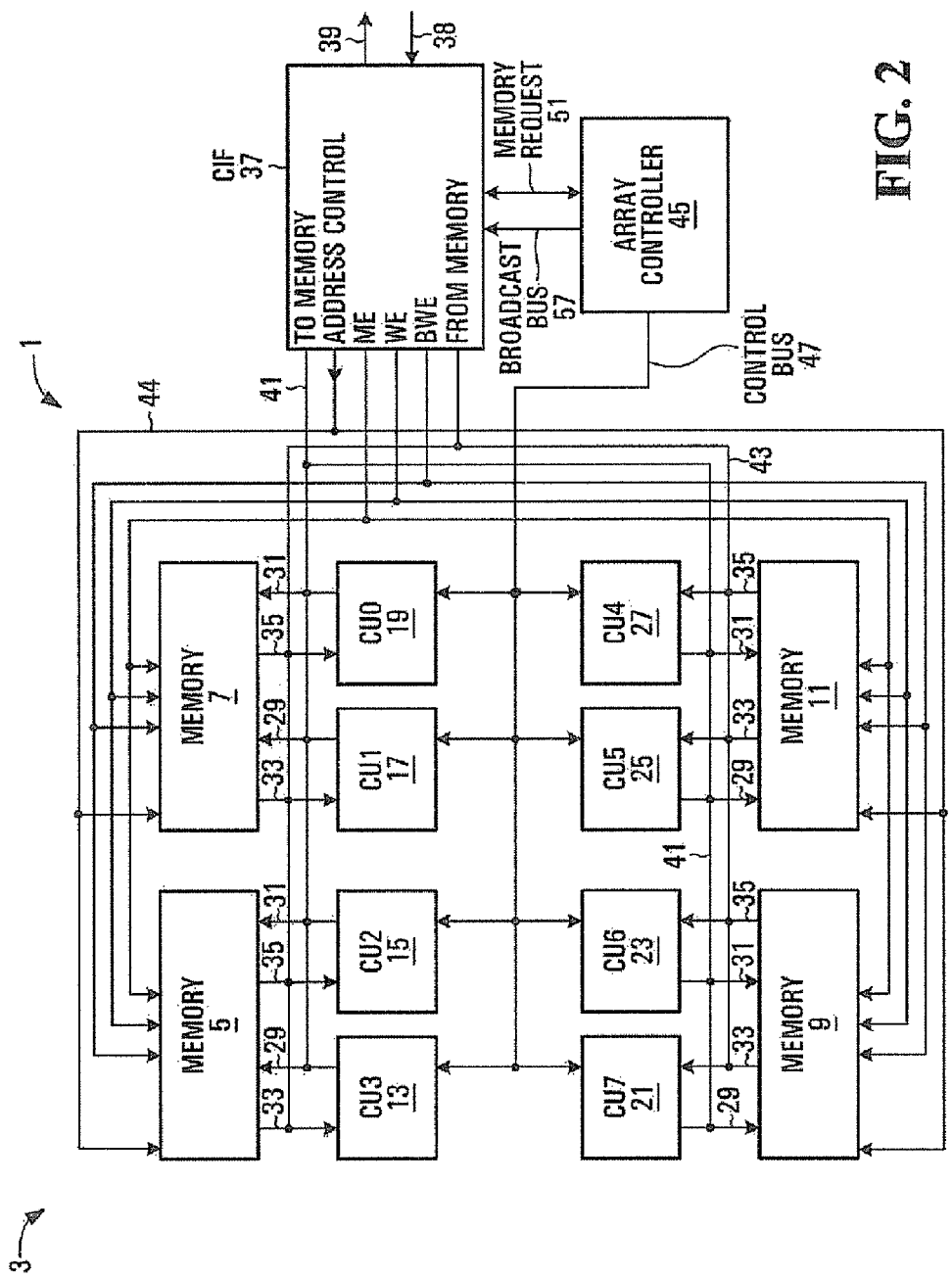
FIG. 2 shows a block diagram of a data processor apparatus according to an embodiment of the present invention.

FIG. 2 shows a data processor according to an embodiment of the present invention. The data processor is similar in some respects to that shown in FIG. 1, and like parts are designated by the same reference numerals. In particular, the data processor apparatus 1 comprises a memory 3 and a plurality of processor units coupled to the memory. In this example, the memory 3 comprises a plurality of memory segments or memories 5, 7, 9, 11, and two processor units 13, 15, 17, 19, 21, 23, 25, 27 are coupled to each memory segment. In one embodiment, the memories may be 16 bits wide and the processor units may each be 8 bits wide. The upper part of the memory having a width of 8 bits, and I/Os 8-15, is couplable to one of the processor units 13, 17, 21, 25 and the lower part of the memory having a width of 8 bits, and I/Os 0-7, is couplable to the other processor unit 15, 19, 23, 27. Each memory has data inputs 29, 31 for receiving data to be stored in the memory and data outputs 33, 35 for outputting data from the memory. In this example, the upper part of each memory has a data input 29, comprising input ports for bits 8-15, and the lower part has a data input 31 comprising input ports for bits 0-7. Similarly the upper and lower parts of each memory has a data output 33, 35, respectively, comprising output ports for bits 8-15 and 0-7, respectively.

The data processor 1 comprises a memory interface block 37 for coupling the memory externally so that the memory can receive data from and output data to the outside world. To this end, the memory interface 37 comprises a data input port 38 for receiving external data and may include an output port 39 for outputting data externally. The memory interface 37 also arbitrates access to the memory by external source(s) and by the processor units. A data bus 41 is connected from the memory interface 37 to each memory input port 29, 31 for transferring data from the memory interface to the memory, and a data bus 43 is connected between the memory interface 37 and the output ports 33, 35 of the memory for carrying data from the memory to the memory interface.

An address bus 44 is connected from the memory interface 37 to each memory segment 5, 7, 9, 11 for carrying memory address control data, e.g. row select signals, to select the memory location (e.g. row) to which data is to be written to or read from. The memory address bus may have any desired width depending on the depth (i.e. number of rows of storage elements in each memory segment and is typically "n", where the number of rows is 2n).

The memory interface may be capable of generating the same signals described above in connection with the embodiment of FIG. 1 and to operate in a similar manner.

Thus, the memory interface 37 is capable of generating the following signals:

a) ME—memory enable. This signal turns the memory on and off. For example, when ME equals 1, the memory is on, and when ME equals 0, the memory is off. In some embodiments, each memory or memory segment 5, 7, 9, 11 receives its own ME signal. This enables individual memory elements to be turned off when not in use to save power. In other embodiments, two or more memory segments or elements share the same ME signal.

b) WE—write enable. This signal controls the memory between write mode and read mode. For example, when WE equals 1, the memory is in write mode, and when WE equals 0, the memory is in read mode. In some embodiments, each memory or memory segment 5, 7, 9, 11 receives its own WE signal. In other embodiments, a WE signal may be shared by two or more memory segments or elements.

c) BWE—byte write enable. When the memory is in write mode, BWE enables or disables a byte wide subset of the input pins. This allows byte wide conditional writes to memory to be performed. For example, if the memory IO (input/output) width is 16 bits, and the data bus to the memory from the memory interface 37 is 8 bits wide, it is possible to write to the upper 8 bits of the memory by setting (the upper) BWE [1]=1 and (the lower) BWE [0]=0. In this way, although each single bit data line of the data bus is shared between two memory input ports, the byte write enable signal allows one of the two input ports to be selected for writing data into memory. In some embodiments, separate BWE signals are generated for each memory element, so that each element is independently controlled by its own BWE signal. In other embodiments, two or more memory elements may share the same BWE signal, e.g. either BWE [1] or BWE[1] or both. For example, all memory elements may share at least one BWE signal.

A means may be provided to enable the processor units to individually control the BWE signals associated with them. For example, the BWE signal from the memory interface 37 may be OR'd with a BWE signal from each processor unit. This ORing can be implemented so that when the array controller makes a memory request to the memory interface, the memory interface 37 outputs BWE [1]=BWE [0]=0, and the processor units can then control their respective BWE inputs.

For write operations from the processor units into their respective memories or memory segments, all ME and WE signals are set to 1, and the processor units control the BWE inputs. For write operations from an external source into memory, the memories can be controlled so that only one of the memories is write enabled (ME=WE=1) and the memory interface 37 may turn on only one of the upper or lower byte write enable signals BWE [1] and BWE [0]. Thus, the interface can select which memory segment or element and the upper or lower part of the selected memory segment to which data is to be written.

In this embodiment and in contrast to the embodiment of FIG. 1, the array controller 45 for controlling operations of the data processor units is arranged to transmit data intended for each processor unit (i.e. broadcast data) to the memory, and is adapted to control each processor unit to receive the broadcast data from the memory 3. Advantageously, this arrangement eliminates the need for a dedicated broadcast bus from the array controller to each PU, which thereby enables the area/space required to accommodate the data processor to be significantly reduced.

In the example shown in FIG. 2, this functionality is implemented by a data (or broadcast) bus 57 for transferring broadcast data from the array controller to the memory interface 37, and by the memory interface 37 being capable of transferring data from the data bus 57 to the data bus 41 connected between the memory interface 37 and each memory or memory segment 5, 7, 9, 11. Thus, in this arrangement, existing hardware (i.e. the data bus 41) is reused to perform the same function as a dedicated broadcast bus, for example, shown in FIG. 1. Broadcast data received from the array controller is transferred by the memory interface onto the data bus 41 and into each memory or memory segment. The broadcast data is then downloaded from the memories into their respective processor units.

Although the transfer of broadcast data from the array controller to each processor unit may require more cycles than a processor with a dedicated broadcast bus, and may therefore be less efficient when considering cycle count, an arrangement in which broadcast data is transferred to each processor unit using other existing hardware is much more efficient in terms of area.

However, in some implementations that have a dedicated broadcast bus from the array controller to each processor unit, the broadcast bus may comprise fewer bus lines i.e. have smaller width than required to transmit a complete broadcast data unit in one cycle. For example, the broadcast bus may have a single bit width to save space/chip area. If the broadcast data has a width of 8 bits, it will require 8 send cycles to transmit the 1 byte broadcast data. Advantageously, embodiments of the present invention which are arranged to transmit broadcast data using the memory data bus can significantly reduce the time/number of cycles required to transfer multiple bit broadcast data to the processor units over this former arrangement, as the data bus may have a width which corresponds to or exceeds the width of the broadcast data. For example, a transfer of broadcast data from the array controller to each processor unit may only require two or three cycles: one write cycle from the array controller, via the memory interface to the memory, and one read cycle from the memory to the processor units, and possibly an additional cycle between the write and read cycles to address the memory, although the memory address operation may take place during the read cycle, in which case only two cycles are required. Thus, for one byte data, this would be about three to four times faster than broadcasting the data to the processor units one bit at a time over a dedicated broadcast bus.

In some instances, it may be possible to pipeline the memory broadcast, and subsequent loading of the broadcast data from the memory into the processor units. For example, in some embodiments, the array controller may be adapted to perform the operation of transferring broadcast data to the memory during one or more cycles when the array controller is not required to send instructions to the processor units (via the control bus). For example, there may be cycles in which the processor units are in an idle state (NO OP) or are performing an internal operation (such as accumulate), and during such cycles, no signaling from the array controller to the processor units is required. The array controller may be adapted to use these cycles to transfer broadcast data into the memory so that it is available to be transferred from the memory into the processor units in advance of the applicable load instruction. In this way, cycles in which the array controller will otherwise be inactive are used to pre-load broadcast data into the memory so that this operation does not add to the number of cycles or time required to perform a broadcast operation and is effectively "hidden" in other cycles. Assuming a load operation from the memory into the processor units requires no more cycles than a conventional data broadcast operation from the array controller to the processor units using a dedicated broadcast bus, an implementation in which broadcast data is transferred from the array controller to the processor units via the memory interface and memory is just as fast if not faster than the conventional method. Thus, for example where the broadcast data is one byte and the dedicated broadcast data bus has a similar width so that a data broadcast can be performed in one cycle, the conventional method is no faster than the above embodiment implemented with broadcast data pre-load, and both can be performed in one cycle. However, where the conventional dedicated broadcast bus is only one bit wide and therefore 8 cycles are required to transfer a byte of broadcast data, the data pre-load implementation would be up to 8 times faster.

In one embodiment, the array controller is adapted to look ahead in the instruction set to identify load instructions for loading broadcast data into the processor units. The array controller may further be adapted to identify cycles before the load instruction in which the array controller is not required to send instructions to the processor units, and use these cycles to transfer broadcast data from the array controller into the memory, so that when the array controller transmits the load instruction to the processor units, the broadcast data is already available in the memory and can immediately be downloaded from the memory into the processor units.

A non-limiting example illustrating an operation of the data processor shown in FIG. 2 will now be described. In this example, each processor unit is 8 bits wide and the broadcast bit has an 8 bit value. Also in this example, the memory bus is 16 bits wide and is connected to all of the memory inputs of each memory or memory segment. The array controller transmits the broadcast data to the memory interface via bus 57, together with a store request via bus 51, which includes memory address information identifying the memory location(s) in which the broadcast data is to be stored. On receiving the broadcast data and store request, the memory interface 37 "makes two copies" of the broadcast data and one copy is output from the memory interface onto one group of data bus lines (e.g. bits 0 to 7) and the other copy is output onto another group of data bus lines (e.g. bits 8 to 15). (In practice, the memory interface need not literally make two copies of the broadcast data. Rather, the transfer of data from the broadcast bus 57 to the memory bus 41 may simply be performed by switching, so that, in this example, the 8 bit data from the AC is switched onto both sets of memory bus lines 0-7 and 8-15, and this may be done so that both sets are connected to each of the 8 one bit bus lines of the broadcast bus that are carrying the data substantially simultaneously. Of course, the broadcast bus 57 may have any width, e.g. more than 1 byte, for example 2 bytes or more). The memory interface turns all of the memories on at the same time (ME=1), puts all of the memories into write mode (WE=1) and enables all of the inputs, BWE[1]=BWE[0]=1, so that the 8 bit value is written to each memory or memory segment of all processor units, and may be written to the same memory space within each memory or memory segment (or to different memory spaces within different memory segments). To transfer the broadcast data into each processor unit, the array controller 45 issues a load (LD) request to the memory interface specifying the address (or addresses) where the broadcast data is stored. The memory interface then controls each memory to download the broadcast data into each processor unit. For example, the memory interface turns on all of the memories (ME=1), and puts all of the memories into read mode (WE=0), so that the byte of broadcast data is read from the memory segments into all processor units. (The BWE signals are normally only used during write operations.)

In another embodiment, the same bus lines may be shared between different memory inputs of the same memory segment. For example, the data bus 41 may be 8 bits wide, each memory 10 may be 16 bits wide, and each 1 bit data bus line is connected to two memory inputs. Thus, line 0 of the data bus may be connected to input ports 0 and 8 of the memory, line 1 of the data bus may be connected to input ports 1 and 9 of the memory and so on. In this case, the array controller may issue 8 bit broadcast data to the memory interface 37 and the memory interface outputs the 8 bit broadcast data onto the 8 bit wide data bus. The memory interface sets the byte write enable (BWE) of both the upper and lower memory sections to 1, thereby enabling the 8 bit broadcast data to be written into both the upper and lower memory sections simultaneously. In this embodiment, duplication of the broadcast data received from the array controller is not required.

In some embodiments of the present invention, the array controller may be adapted to limit a broadcast data to one particular processor unit or to one or more subgroups of processor units under its control. For example, where the data processor comprises a two-dimensional array of processor units, the array controller may be adapted to limit the transmission of a particular broadcast data to one or more specific rows of processor units or one or more specific columns of processor units, or to any other subgroup of processor units within the array. This may be particularly beneficial where one or more processor units are required to perform an operation on different data to other processor units. For example, in video applications, the processor units may be divided functionally to operate on different aspects of video data. For example, part of the data processor apparatus may be used to process luminance information (e.g. Y values), and another part may be used to process chrominance information (e.g. U and V values). In this case, same data may be required by processor units processing one kind of data (e.g. luminance) but not by processor units processing another kind of data (e.g. chrominance data). Advantageously, the array controller can be adapted to broadcast same data to only those processor units to which it is applicable. Examples of how this functionality may be implemented is described below with reference to FIG. 2.

Referring to FIG. 2, in one implementation, the address control bus from the memory interface 37 is shared between all memory segments 5, 7, 9, 11, so that all memory segments receive the same row address data from the memory interface. As described above, when the array controller is to transmit broadcast data to all CUs within the array, the array controller specifies the row address in the memory request to the memory interface and the memory interface outputs this row address onto the address bus so that the broadcast data is initially stored at the specified row address in each memory segment.

In order to restrict broadcast data to a subgroup of selected processor units, any one or more of a number of various methods or techniques can be used. Broadly, these include restricting the initial write operation to memory to the memory locations of the subgroup, restricting the read operation from memory to the subgroup of PUs, restricting the write operation of the processed broadcast data back to memory to the subgroup and/or restricting the subsequent read operation of the processed data from memory to the memory locations of the subgroup.

For example, the data may initially be transferred to the memories of all PUs, and the subsequent transfer from memory may be restricted to the subgroup. Alternatively, the initial memory write may be restricted to memories of the subgroup, and the subsequent load may be unrestricted, so that a data load is performed for all PUs. In this case, the contents of memories of the unselected processor units may be inert so that it is not treated as broadcast data. On the other hand, arbitrary data may be downloaded into the unselected PUs, but not processed by disabling them. On the other hand, arbitrary data may be processed by the non-subgroup member PUs and the result of these calculations can be restricted subsequently. For example, the unselected PUs can be disabled from writing their results to memory. For example, this may be achieved by turning the non-subgroup members off during the write operation or disabling the write using the BWE signals. Alternatively, both the memory write and read operations of broadcast data may be restricted to the subgroup.

Thus, in one example, to restrict broadcast data to one or more selected processor units, the broadcast data may be transferred only to the memory segments associated with the selected processor units, and to perform this function, the array controller is adapted to generate and output control signalling to the memory interface, which then allows the memory interface to control the memory segments to which broadcast data is written. The control signalling may be any suitable signalling that allows the memory interface to identify which memory segments the broadcast data is to be written to. In one example, the control signalling may comprise a special address which uniquely identifies a memory segment or group of memory segments to which data is to be written. For example, each memory segment may be 1,024 rows deep. The row addresses of each of the memory segments may be unique inter se, so that for example, the first memory segment 5 has row addresses numbered 0 to 1,023, the second memory segment 7 has row addresses numbered from 1,024 to 2,047, the third memory segment has row addresses numbered 2,048 to 3,071 and the fourth memory segment has row addresses numbered 3,072 to 4,095, and these may be used in normal addressing when addressing a particular location (e.g. row) in one of the memory segments (or memory macros). If data is to be written to two or more memory segments at a time, a new address range can be used that uniquely identifies the specific segments. For example, a read/write operation from or to memories 5, 7 in the upper row of FIG. 2 may have an address range of 4,096 to 5,119, and a read/write operation from or to memories 9, 11 in the lower row may have an address range of 5,120 to 6,143. To broadcast data to all memory elements 5, 7, 9, 11, all memory elements may be identified by another unique address range, for example, 6,144 to 7,167.

The memory interface detects and responds to a specified address (within each particular range) to control read and/or write operations to specific subgroups or all of the memory elements. For example, to address both memory segments 5, 7 at the same time, the first row address of segment 5, i.e. address 0 in the example, and the first row address of segment 7, i.e. address 1,024, are both uniquely identified together as a single address within the unique address range for these two segments (4,096 to 5,119), and the single address may be 4,096. On receiving this address, the memory interface sets ME=1, for segments 5, 7 in the upper row, and ME=0 for segments 9, 11 in the lower row (and/or BWE [1]=BWE [0] for a write operation) and writes or reads data to or from the first row addresses of both upper memory segments only.

Similarly, individual or groups of columns of memory segments, memory segments on a diagonal or any arbitrary subgroup of memory segments can be uniquely identified by a specific address range.

Advantageously, by using unique address ranges for each group of memory segments, so that a specific address within each range uniquely identifies a plurality of memory locations, there is no need for any additional signalling from the array controller or other data source that identifies the memory segments of the subgroup.

In one embodiment, the memory interface stores information which correlates address data to a specific memory segment and based on this correlation, the memory interface transmits memory enable signal(s) to the appropriate memory segments to turn them on and allow data to be written thereto. In the above example, on receiving the specified address 4,096, the memory interface interprets from the correlation data (which may be stored in a lookup table) that the broadcast data is intended for the memory segments of the first row only, and sets the memory enable (ME) signal for the upper row memory segments 5, 7 to 1 and the memory enable signals for the other memory segments 9, 11 to 0. In this way, the broadcast data is only written to the memory segments of the first row.

To load the broadcast data into the first row of processor units 13, 15, 17, 19, the array controller specifies the address of the broadcast data to the memory interface, (in this example 4,096 which defines the memory segments in which the data is stored). The memory interface sets ME=1 and WE=0 for memory segments 5, 7 and sets ME=0 for memory segments 9, 11. As a result, the broadcast data will be loaded into the upper row of processor units only. Alternatively, the array controller may specify to the memory interface the row addresses in which data is stored without limiting the data read to any memory segments so that all memory segments are read enabled. Thus, in the present example, if address 6,144 uniquely identifies the first row address of all memory segments 5, 7, 9, 11, the array controller can specify this address to the memory interface. In this case, data from the specified row addresses will be loaded into all processor units. However, only the upper row of PUs will receive the broadcast data as the data was only previously written into their associated memories. The other PUs will receive the data stored in their respective memories which may be previously set to any desired value. The value may be such that it has no effect on the next calculation, for example 1, for multiplication or division, or 0 for addition or subtraction. Alternatively, or in addition, all of the PUs could receive and process the data and only the top PU results would be valid, or the bottom PUs and/or their respective memories could be disabled (addressing takes care of the memories) so that the bottom PUs are turned off when the others are processing data that is only valid for the first row, and/or the memories of the lower PUs are turned off when the results are being written into the memories.

By specifying an address in a specific address range in the array controller signalling, broadcast data may be limited to any single processor unit or group of processor units.

In another example, if broadcast data is to be limited to one or more specified column(s) of processor units, for example processor units 13 and 21 in the first column, and processor units 15 and 23 in the second column, these may be uniquely addressed by the address range 8,190 to 9,213 to identify the first memory segment 5 associated with the first processor units 13, 15 in the first and second columns respectively and to identify the third memory segment 9 associated with the second processor elements 21, 23 in the first and second columns, respectively. In response to an address within this address range, the memory interface sets the memory enable signal for memory segments 5 and 9 to 1 and the memory enable signal for the other memory segments 7, 11 to 0. In this way, the array controller writes broadcast data to the first and third memory segments, 5, 9 only.

To load the broadcast data into the first and second columns of processor units, the array controller specifies the address of the broadcast data to the memory interface (i.e. within the range 8,190 to 9,213 in this example), and the memory interface puts the appropriate address signals on the address line and outputs appropriate memory enable signals to the memory segments in which the broadcast data is stored and to be loaded into the selected processor units.

If broadcast data is to be broadcast to only one column of processor units where a plurality of processor units are served by the same memory, the byte write enable (BWE) signal may also be used to limit the broadcast data to be written into the selected column. For instance, in the example described above, if broadcast data is to be written only to the second column of processor units 15, 23, when writing to memory from the interface, the low byte write enable signal BWE [0] may be set to 1 and the high byte write enable signal BWE [1] may be set to 0, during the memory write operation so that the broadcast data to the memory segments 5, 9 is written only into the memory portions of the memory segments 5, 9 of the second column of processor units 13, 21. This may be implemented by the memory interface setting the high byte BWE [1] signal to 0 and setting the low BWE signal to 1. (The array controller may also transmit a control signal to the processor units in the first and second columns for their write operation to memory which control the first column of processor units to set their BWE to 0 and the processor units in the second columns to set their BWE signals to 1.)

The load from memory into the PUs may be restricted to the second column of PUs, for example by disabling the others, or data may be loaded into all PUs and restricted subsequently.

In another embodiment, the array controller may be adapted to broadcast data to one or more selected processor units by initially broadcasting data to memory segments associated with processor units to which data is to be written and also to the memory segments associated with processor units to which broadcast data is not to be written, and then select the appropriate processor units when performing the load operation of broadcast data from the memory to the data processor units. For example, the array controller may be adapted to initially write broadcast data into all memory segments 5, 7, 9, 11. Then, during the read operation, the memory segments are controlled via the memory interface and the processor units are controlled via the array controller (as necessary) to transfer broadcast data into the selected processor units. This may be achieved by setting the memory enable signals for each memory segment to the appropriate values and selectively turning on and off appropriate PUs and/or memory segments or otherwise selectively enabling and disabling PUs during the memory read.

In other embodiments, the array controller may be adapted to generate any other signalling to select a subgroup of one or more processor units to which to broadcast data. For example, instead of specifying an address within a specific address range, each memory segment or processor unit may have a unique identifier, which may be used by the array controller to identify the memory segments or PUs to which the broadcast data is to be sent. In other embodiments, each subgroup of memories or PUs may have a unique identifier that is used by the array controller to identify the target memories and/or PUs.

In some embodiments, the data processor apparatus may be adapted to permit one or more other devices to broadcast data to the memory and/or to a plurality of processor units. For example, such a device may be an external device which is connected to the memory interface via a bus. An example of an embodiment having one or more external devices capable of transmitting broadcast data to the data processor is shown in FIG. 3.

Figure 3:
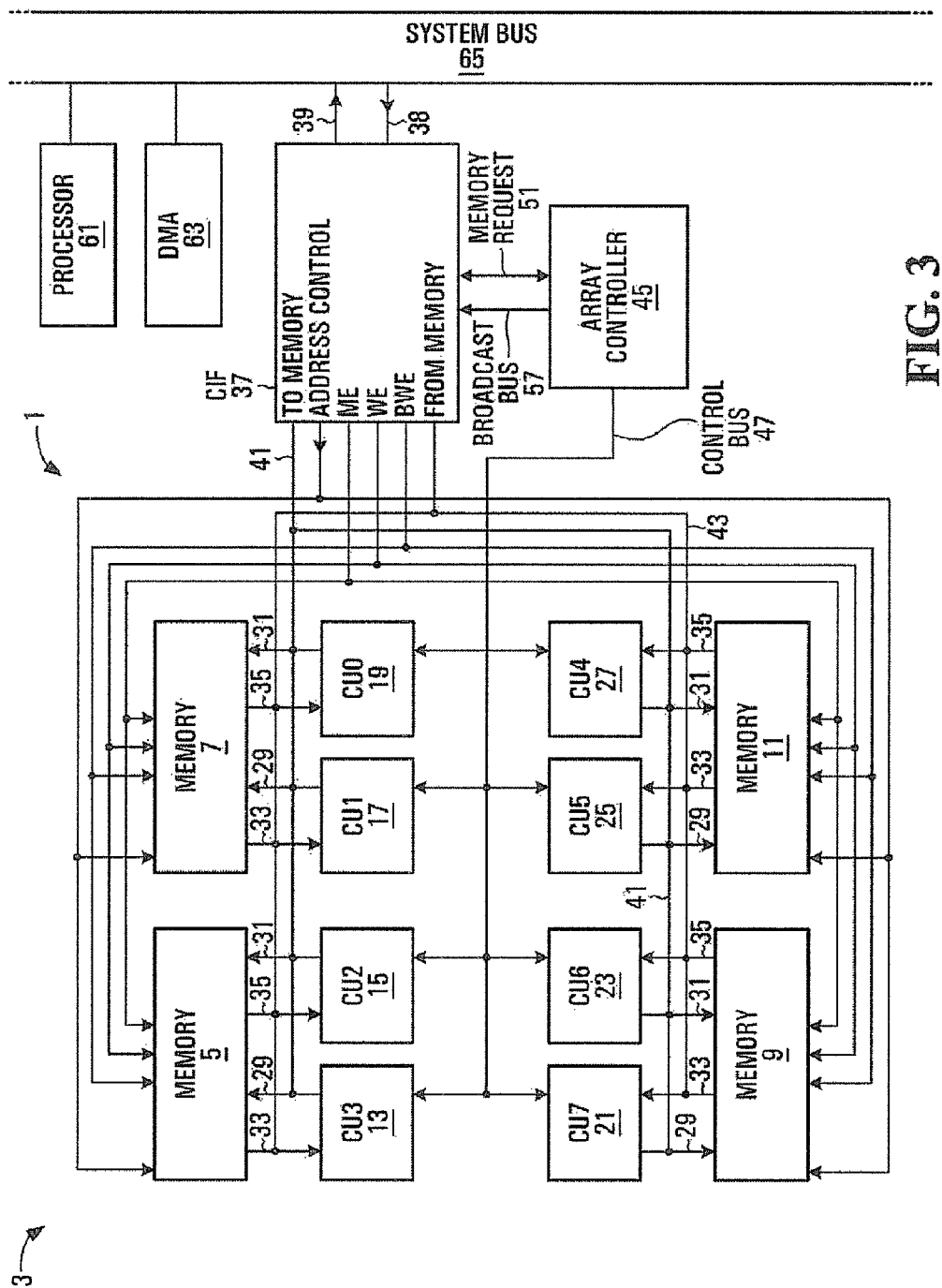
FIG. 3 shows a block diagram of a data processor apparatus according to another embodiment of the present invention.

Referring to FIG. 3, a data processor apparatus 1 comprises a plurality of memory segments 5, 7, 9, 11 and a plurality of processor units 13, 15, 17, 19, 21, 23, 25, 27, a memory interface 37 and an array controller 45. The data processor 1 is similar to that shown in FIG. 2, and like parts are designated by the same reference numerals. In addition, the apparatus comprises external devices, for example an external processor 61 and a DMA (Direct Memory Access) device 63 which are connected to the memory interface 37 by a system bus 65. The external processor may comprise any suitable processor and in one embodiment may comprise a RISC (Reduced Instruction Set Code) processor such as an ARM processor (Advanced RISC Machine).

In one embodiment, the system bus 65 comprises a plurality of one bit data lines in which the same data lines carry both information data and control data (for example address data). For example, the external devices may be adapted to transmit the control data and information data consecutively on the same data lines. In another embodiment, the system bus may comprise separate data and address buses, each having for example a plurality of one bit data lines so that control data and information data can be transmitted in parallel.

As mentioned above, the data processor apparatus may be configured such that the memory associated with each processor unit is individually addressable through the memory interface. This is achieved through the address control which selects the memory row address, the memory enable which can select individual memory segments, and the byte write enable (BWE) signals which select the high byte and low byte memory inputs independently, thereby effectively selecting the memory portion of a memory segment associated with a particular processor unit. Each row of memory associated with each processor unit may have a unique address which may be specified by an external device to access a particular memory location. Thus, for example when the processor 61 requests a memory access, it transmits the unique address onto the system bus to the memory interface. In response to the address information, the memory interface translates the address into appropriate row address control, ME, WE and BWE signals to access the requested memory location.

To broadcast data from an external device to all processor units or a selected subgroup of processor units, the external device uses an addressing scheme that identifies a plurality of addresses of all PUs or a subgroup thereof. For example, the external device may use different address ranges that identify addresses within specific subgroups of PUs, and may use a similar or the same scheme described above for the array controller. The memory interface receives the address from the external device via the system bus, interprets it, and controls the memory segments so that broadcast data is written into the appropriate memory locations. Alternatively, the array controller can be used or programmed to load or broadcast data to the PUs.

Any suitable signalling may be used to control the memory interface to treat data transmitted from an external device as broadcast data intended for a plurality of processor units, examples of which include an address within a specified range of memory addresses or other signal(s) which the memory interface can decode into appropriate address control, ME, WE and BWE signals. In some embodiments, the signals may be similar to those generated by the array controller as described above in conjunction with the embodiment of FIG. 2. In some embodiments, when an external device provides broadcast data to a selected subgroup of processor units, the data processor may initially control the memory interface to broadcast data to the memories associated with all processor units, and then control the array controller to control the memory interface and processor units so that the broadcast data is downloaded only into the processor units of the selected subgroup.

In some embodiments, the broadcast functionality of the memory interface may be used by an external device (or the array controller) to transmit the same data to a plurality of memory locations (e.g. rows of memory) associated with each of one or more processor units. For example, the device may specify a range of memory addresses of a PU's local memory to which the same data is to be written and the memory interface may be adapted to populate the memory addresses with the data based on the specified memory address range.

For example, using this method, broadcast data may be written to a plurality of rows of the local memory associated with the first processor unit 13, i.e. the high byte of segment 5.

In this way, the memory interface can repeatedly write the same data to different memory locations of a local memory based on a single or minimal instruction(s), so that the external device or array controller need not be actively involved in every write cycle. This releases the device from the write task so that it is free to perform other functions.

In some embodiments, the memory interface may be adapted to respond to a broadcast signal to populate all of the memory (i.e. all rows of all memory segments) with the same data. This functionality may be useful, for example, to initialize the memory.

In embodiments of the present invention, the memory or memory segments may have any desired width and depth and each memory may have any number of I/Os. The data processor may comprise any number of memory segments and each memory may have any number of associated processor units couplable thereto. Each processor unit may be capable of processing data of any desired width. For example, each processor unit may comprise a single bit processor element or each processor unit may be capable of processing multiple bit words of any length. In one embodiment, each processor unit may comprise a plurality of one bit processor elements which may, for example, be arranged to operate substantially in parallel. The processor elements may each be arranged to operate on a single bit of a multiple bit word.

One or more processor units may comprise only data receiving means (e.g. one or more registers), without any processing capability or may comprise a processor for performing operation(s) on data.

Each memory or memory segment may be physically separate from each other, or may be part of the same memory of memory block.

Elements of the data processor may be formed on a single monolithic substrate, e.g. semiconductor chip. In one embodiment, the memory or memories are integrally formed with the processor units as an integrated circuit. The array controller and/or the memory interface may also be formed on the same integrated circuit with the memory and processor units.

In other embodiments of the present invention, the array controller may be adapted to transmit both control data and information data (e.g. broadcast data) to one or more data receiving units on the same bus. For example, the control data and information data may be transmitted sequentially (i.e. one after the other), in either order. Although this would eliminate the need for a separate dedicated broadcast data bus, thereby saving chip area, this implementation may require more cycles to transfer the control and information data than in other implementations. In this embodiment, the array controller may also be implemented to transfer data intended for one or more data receiving units into the receiving unit(s) via the memory, so that the array controller can selected which of the two data paths to use in transferring data to the data receiving unit(s).

In other embodiments, the data processor may include both a dedicated broadcast data bus for transferring broadcast data directly from the array controller to the data receiving units and a data bus which transfers data from the array controller to one or more data receiving units via the memory. This implementation allows the array controller flexibility as to the methodology used to transfer broadcast data to one or more data receiving units.

Other embodiments of the present invention comprise any one or more features disclosed herein in combination with any one or more other features disclosed herein.

Any aspect or embodiment of the present invention or any feature thereof may be combined with any aspect or embodiment of the invention or any feature thereof disclosed or claimed in the applicant's co-pending U.S. provisional application Ser. No. 60/675,899 entitled "Apparatus and Method for Controlling Access to a Memory" filed on 29 Apr., 2005, the entire contents of which is incorporated herein by reference.

The data processor has wide application, and may be implemented on a SIMD processor, for example. The processor may be used for image processing, including still and/or video image processing for instance, and/or other computational applications.

Any one or more components of the memory and/or data processor units and/or array controller and/or memory interface can be integrally formed as an integrated circuit on a single substrate or chip.

Numerous modifications and changes to the embodiments described above will be apparent to those skilled in the art.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus, comprising:
 a plurality of memories;
 a plurality of processing units respectively coupled to said plurality of memories;
 an interface coupled to said plurality of memories by a plurality of buses, at least one of the plurality of buses being at least one data bus for transferring data from said interface to said plurality of memories, said interface configured to control access to said plurality of memories using an identifier to identify a memory location in one of said plurality of memories and another memory location in another of said plurality of memories; and
 an array controller coupled to said plurality of processing units by a control bus for sending at least one of instructions and commands to each of the plurality of processing units, and coupled to said interface by a broadcast bus, said array controller configured to provide broadcast data to at least said memory location via said interface and said at least one data bus by first providing said broadcast data to said interface via said broadcast bus, and control, via said at least one of instructions and commands sent via said control bus, at least one of said plurality of processing units that corresponds to said memory location to receive said broadcast data from said memory location,
 wherein said at least one data bus is thereby used to provide both said data and said broadcast data from said interface to said memory location, and
 said interface is further configured to identify said memory locations substantially simultaneously.

2. An apparatus as claimed in claim 1, wherein said interface uses a second identifier to identify at least a memory location in said one of said plurality of memories and another memory location in said another of said plurality of memories, and at least one of said memories identified by said second identifier is different to at least one of said memories identified by said identifier.

3. An apparatus as claimed in claim 2, wherein said second identifier comprises an address.

4. An apparatus as claimed in claim 2, wherein said interface is configured to identify said memory locations identified by said second identifier substantially simultaneously.

5. An apparatus as claimed in claim 2, wherein said identifier identifies a memory location in each of a plurality of memories, and said plurality of memories is less than a total number of memories for which said interface controls access.

6. An apparatus as claimed in claim 1, wherein said identifier identifies a memory location in all of said plurality of memories for which said interface controls access.

7. An apparatus as claimed in claim 1, wherein said identifier comprises an address.

8. An apparatus as claimed in claim 1, wherein said plurality of memories can access a same data on said at least one data bus.

9. An apparatus as claimed in claim 1, wherein, when said plurality of buses include a plurality of data buses, each data bus coupled to at least one of said plurality of memories, wherein said interface comprises an input port and an output port configured to receive data and output said data onto each data bus.

10. An apparatus as claimed in claim 9, wherein said interface is configured to output said data onto said plurality of data buses substantially simultaneously.

11. An apparatus as claimed in claim 1, further comprising a set of identifiers, wherein each identifier identifies at least a memory location in one of said plurality of memories and another memory location in another of said plurality of memories.

12. An apparatus as claimed in claim 11, further comprising a second set of identifiers, wherein each second set of identifiers identifies at least a memory location in one of said plurality of memories and another memory location in another of said plurality of memories, and at least one of said memories identified by said second set of identifiers is different from at least one of said memories identified by said set of identifiers.

13. An apparatus as claimed in claim 1, wherein respective processing units are coupled to a respective one of said plurality of memories.

14. A memory interface for controlling access from an array controller to a memory via a plurality of buses, said memory interface comprising:
- a data input configured to receive data from said array controller for said memory via a broadcast bus;
- a data output configured to transfer data to said memory via said plurality of buses, at least one of the plurality of buses being at least one data bus; and
- a memory interface block configured to transfer a predetermined data unit received at said data input from said array controller to a plurality of different memory locations in said memory via said at least one data bus so that a copy of said predetermined data unit is stored in each of said plurality of different memory locations,
- wherein, when a plurality of processor units capable of accessing said memory is coupled to said memory, said memory interface block is adapted to at least partially control said memory to transfer data from said memory to one or more of said plurality of processor units,
- said at least one data bus is thereby used to transfer both said data and said predetermined data unit from said memory interface block to said memory, and
- said memory interface block is further configured to transfer said predetermined data unit into said plurality of different memory locations substantially simultaneously.

15. A memory interface as claimed in claim 14, wherein, when said memory comprises a plurality of memories, said plurality of memories are each independently controllable by said memory interface in at least one respect, and said plurality of different memory locations are located in different independently controllable memories.

16. A memory interface as claimed in claim 15, wherein each of said plurality of memories being independently controllable includes at least one of each of said plurality of memories being independently enabled and disabled, each of said plurality of memories being independently write enabled, each of said plurality of memories being independently read enabled, a column address of each of said plurality of memories being independently controlled and a row address of each of said plurality of memories being independently controlled.

17. A memory interface as claimed in claim 14, further comprising a control input configured to receive a control signal, and wherein said memory interface block is further configured to respond to a control signal to identify said memory locations in which said predetermined data is to be stored to transfer said predetermined data to said plurality of different memory locations.

18. A memory interface as claimed in claim 14, wherein said memory interface block is configured to receive data from said memory, and said memory interface block is responsive to a control signal from said array controller to transfer said predetermined data unit to said plurality of different memory locations.

19. A method of transferring data from an array controller to a plurality of data receiving units controlled by said array controller in a data processor apparatus comprising a memory and said plurality of data receiving units couplable to said memory, the method comprising:
- transmitting said data from said array controller to one or more of said data receiving units using a structure other than a broadcast data bus between said array controller and said plurality of data receiving units; and
- transferring said data from said array controller to each data receiving unit via said memory,
- wherein said data is a broadcast data, and said broadcast data from said array controller is transferred to each data receiving unit via a control/instruction bus connected between said array controller and each data receiving unit, so that said control/instruction bus is used to transfer both control/instruction data and said broadcast data from said array controller to said memory.

20. A method as claimed in claim 19, further comprising transferring said data from said array controller to each data receiving unit using a data bus configured to receive data from a source external to said data processor apparatus for said memory and/or for said plurality of data receiving units.

21. A method as claimed in claim 20, wherein said data bus is configured to transfer data from said external source to said memory.

22. A method as claimed in claim 20, wherein said data bus is configured to transfer data from said external source to each data processor unit in a manner that bypasses said memory.

23. A method as claimed in claim 19, wherein at least one of said plurality of data receiving units comprises a data processor unit configured to perform an operation on data.

24. A method of transferring a predetermined data unit from an array controller to a memory of a data processor, the method comprising:
- receiving a predetermined data unit from said array controller for said memory via a broadcast bus;
- identifying a plurality of memory locations in said memory to receive a copy of said predetermined data unit;
- transferring said predetermined data unit to said plurality of memory locations via a data bus from among a plurality of busses connecting an interface to said memory; and
- transferring said data to said plurality of memory locations via said data bus from among the plurality of busses connecting said interface to said memory, so that said data bus is used to transfer both said data and said predetermined data unit from said interface to said memory, and
- said identifying of said plurality of memory locations identifies the said plurality of memory locations substantially simultaneously.

25. A method as claimed in claim 24, wherein said transferring of said data unit to said plurality of different memory locations is performed substantially simultaneously.

26. A method as claimed in claim 24, further comprising receiving a control signal indicative of said plurality of different memory locations and identifying said memory to receive a copy of said predetermined data unit in response to said control signal.

27. A method as claimed in claim 26, wherein said control signal comprises an identifier to identify said plurality of memory locations.

28. A method as claimed in claim 24, wherein said memory comprises a plurality of independently controllable memories and said plurality of different memory locations is located in said plurality of memories.

29. A method as claimed in claim 24, further comprising identifying one or more of said plurality of different memory locations to transfer said predetermined data unit to a respective processor unit coupled to a respective memory location.

30. A method as claimed in claim 29, further comprising transmitting said predetermined data unit to said memory from said array controller configured to control said plurality of processor units.

31. A method as claimed in claim 24, further comprising transmitting said predetermined data unit from a device couplable to said memory.

* * * * *